US011009965B2

(12) United States Patent
Dugo

(10) Patent No.: US 11,009,965 B2
(45) Date of Patent: May 18, 2021

(54) WEARABLE SELF DEFENSE APPARATUS AND METHOD OF SELF DEFENSE

(71) Applicant: Troy Francis Dugo, Charlotte, NC (US)

(72) Inventor: Troy Francis Dugo, Charlotte, NC (US)

(*) Notice: Subject to any disclaimer, the term of this patent is extended or adjusted under 35 U.S.C. 154(b) by 73 days.

(21) Appl. No.: 16/444,051

(22) Filed: Jun. 18, 2019

(65) Prior Publication Data

US 2020/0401229 A1    Dec. 24, 2020

(51) Int. Cl.
*G06F 3/01* (2006.01)
*F41H 13/00* (2006.01)
*H04B 1/3827* (2015.01)
*G06F 1/16* (2006.01)

(52) U.S. Cl.
CPC .......... *G06F 3/017* (2013.01); *F41H 13/0018* (2013.01); *G06F 1/163* (2013.01); *H04B 1/385* (2013.01)

(58) Field of Classification Search
CPC ...... G06F 3/017; G06F 1/163; F41H 13/0018; H04B 1/385
See application file for complete search history.

(56) References Cited

U.S. PATENT DOCUMENTS

| | | | |
|---|---|---|---|
| 4,337,496 A * | 6/1982 | Laird | F41B 15/04 231/7 |
| 5,282,481 A * | 2/1994 | Ziemer | F41H 13/0018 361/232 |
| 9,008,973 B2 * | 4/2015 | French | A63B 24/0087 702/19 |
| 10,372,223 B2 * | 8/2019 | De Michele | G06F 3/017 |
| 2009/0158921 A1 * | 6/2009 | Norman | F41H 13/0018 89/1.11 |
| 2011/0013337 A1 * | 1/2011 | Brown | F41H 13/0018 361/232 |
| 2013/0294005 A1 * | 11/2013 | Garaycochea | F41H 13/0018 361/232 |
| 2016/0328023 A1 * | 11/2016 | Mistry | G06F 3/015 |
| 2019/0018506 A1 * | 1/2019 | Bernstein | H04M 1/72569 |

* cited by examiner

*Primary Examiner* — Michael C Zarroli
(74) *Attorney, Agent, or Firm* — Invention To Patent Services; Alex Hobson

(57) ABSTRACT

A wearable self-defense apparatus having a body portion configured to be worn on or around a body part of a user includes a high voltage generator configured to generate high voltage electricity for disabling an attacker, a high voltage transmitter electrically coupled to the high voltage generator, a controller configured to control one or more operations of the high voltage generator and a gesture detector operationally coupled to the controller. The gesture detector signals the controller to control the operations of the high voltage generator upon detecting one or more gestures of the user using the body part attached with the wearable self-defense apparatus. Upon receiving the signal from the gesture detector, the controller triggers the high voltage generator to generate high voltage electricity. The high voltage electricity thus generated is transmitted to a target using the high voltage transmitter for temporarily disabling the target.

12 Claims, 4 Drawing Sheets

WEARABLE SELF DEFENSE APPARATUS AND METHOD OF SELF DEFENSE

FIELD OF THE INVENTION

The present invention relates to the field of self-defense apparatuses. More particularly, the present invention relates to a wearable self-defense apparatus and a method of utilizing the apparatus for self-defense.

BACKGROUND OF THE INVENTION

Various non-lethal self-defense devices exist in the prior art. Most of the existing self-defense devices make use of electricity to temporarily disable an assailant. One such example of such self-defense device is a stun gun, which when activated, transmits high voltage electricity to the body of the target through a set of electrodes connected to the stun gun. Some other self-defense devices available in the market are in form of a flashlight, which is capable of generating and transferring the high voltage electricity to the target upon activated by the user. However, all such self-defense devices are to be carried by the user in their carry bags or to be attached to a wearable holder. When needed, the user must reach for the self-defense device from the stored place and activate the device pointing the target. Sometimes, when a user carrying a self-defense device faces an assailant there might not be enough time left for the user to reach for the self-defense device and point towards the assailant to disable using high voltage electricity generated by the device. This leaves the user, especially women, vulnerable to such attacks even though they carry such self-defense devices.

The above said drawbacks associated with the use of existing self-defense devices are somewhat solved by the development of wearable self-defense devices. Such wearable self-defense devices are available in various shapes and designs and the user needs to wear the device all the time to protect themselves from getting attacked. Most of the existing wearable self-defense devices are difficult to be worn by the user for long periods and are not aesthetically pleasing. Further, these wearable self-defense devices require the users to activate the device, when in need, by pressing an actuator or a button on the device using a hand of the user. However, such actuation method sometimes would not work if the attacker already sees the movement by the user to activate the self-defense device.

Hence, there is a need for a wearable self-defense device that would solve the problems and drawbacks associated with the existing self-defense devices as discussed above. The needed wearable self-defense device would also be comfortable for the wearer and aesthetically pleasing. Further, the needed wearable self-defense device would allow the users to activate, when in need, in a short time to disable the attacker.

SUMMARY OF THE INVENTION

Accordingly, the embodiments herein disclose a wearable self-defense apparatus having a body portion configured to be worn on or around a body part of a user. The body portion of the wearable self-defense apparatus houses a high voltage generator configured to generate high voltage electricity for disabling an attacker, a high voltage transmitter electrically coupled to the high voltage generator, a controller configured to control one or more operations of the high voltage generator and a gesture detector operationally coupled to the controller. The gesture detector signals the controller to control the operations of the high voltage generator when the gesture detector detects one or more gestures of the user using the body part attached with the wearable self-defense apparatus. Upon receiving the signal from the gesture detector, the controller triggers the high voltage generator of the wearable self-defense apparatus to generate high voltage electricity. The high voltage electricity thus generated is transmitted to a target using the high voltage transmitter of the wearable self-defense apparatus for temporarily disabling the target. A power source housed within the body portion of the wearable self-defense apparatus powers the above said components to generate non-lethal high voltage electricity to temporarily disable a target.

In an embodiment, the body portion of the wearable self-defense apparatus made from non-conductive materials such as plastic or any other material. In some instances, the body portion of the wearable self-defense apparatus includes an adjustable portion for enabling the user to comfortably attach to the body part such as arm or wrist of the user. In some other instances, the body portions house the high voltage generator, the high voltage transmitter, the controller and the gesture detector. In some embodiment, the wearable self-defense apparatus is in form of a wearable band. In some instance, the wearable self-defense apparatus is operated by detecting a rotation of an arm and wrist of the user in a first direction using the gesture detector to signal the controller to trigger the high voltage generator. In some other instances, the wearable self-defense apparatus is operated by detecting a rotation of the arm and wrist of the user in a second direction using the gesture detector to signal the controller to stop an operation of the high voltage generator. In some embodiment, the electricity transmitted in the wearable self-defense apparatus utilizes one or more electrical conductors to transfer the high voltage generated by the high voltage generator to the designated target. In another embodiment, the wearable self-defense apparatus also includes a fitness tracking module having several sensors to detect one or more physical activities of the user.

Another embodiment discloses a method of utilizing the wearable self-defense apparatus worn on the body part of the user for temporarily disabling an attacker. The method performs by detecting one or more gestures by the user using the body part of the user. The gestures are detected using a gesture detector associated with the wearable self-defense apparatus. In an instant, the step of detecting the gesture using the gesture detector includes detecting a rotation of the body part of the user in a first direction to signal the controller to trigger the high voltage generator and detecting a rotation of the body part of the user in a second direction to signal the controller to stop an operation of the high voltage generator. The gesture detector, upon detecting the gesture, signals a controller to trigger a high voltage generator to generate a high voltage. The wearable self-defense apparatus houses the controller and the high voltage generator. The high voltage generated by the high voltage generator is then transferred to the attacker or the target using a high voltage transmitter associated with the wearable self-defense apparatus. The wearable self-defense apparatus houses the gesture detector, the controller, the high voltage generator and the high voltage transmitter in a body portion configured to be worn on the body part of the user. In some instances, the target is identified by pointing the wearable self-defense apparatus in a particular direction towards the target. The above said method of using the wearable self-defense apparatus enables the users to immediately respond to any aggression or attack from an attacker and disable the attacker using the high voltage generated using the apparatus.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments and the embodiments herein include such modifications.

BRIEF DESCRIPTION OF THE DRAWINGS

The accompanying drawings, which are incorporated in and constitute a part of this specification, illustrate one or mom embodiments of the invention and, together with the description, explain the invention. In the drawings.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1:
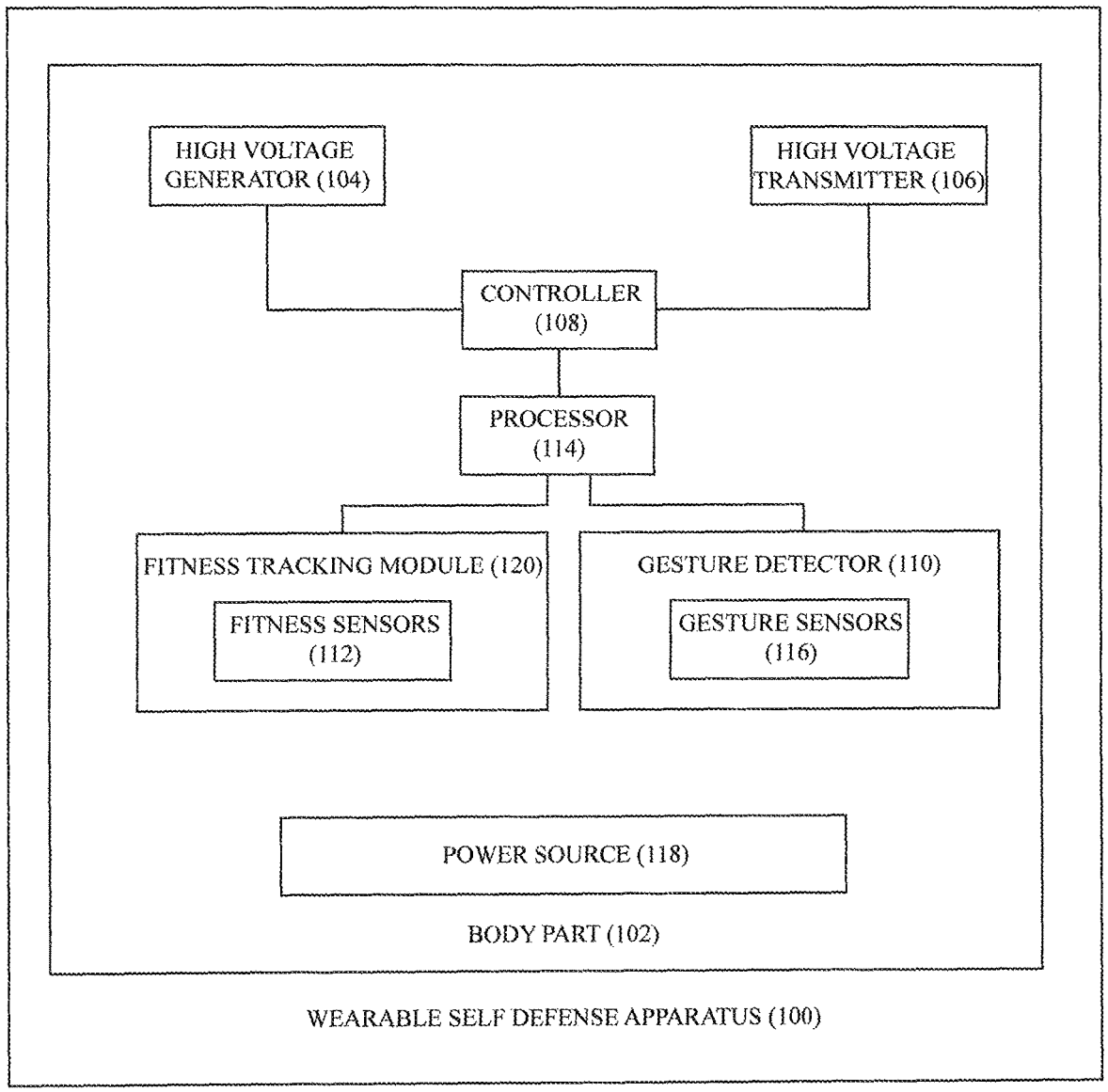
FIG. 1 is an exemplary diagram showing a number of components of a wearable self-defense apparatus.

Accordingly, the embodiments herein provide a wearable self-defense apparatus and a method of using the wearable self-defense apparatus to temporarily disable an attacker. FIG. 1 is an exemplary diagram showing a number of components of a wearable self-defense apparatus 100, according to a preferred embodiment of the present invention. The wearable self-defense apparatus 100 includes a body portion 102 configured to be worn on at least one body part of a user and also configured to house a number of components such as a high voltage generator 104 for generating high voltage electricity, a high voltage transmitter 106 electrically coupled to the high voltage generator for transmitting the high voltage electricity generated by the high voltage generator 104, a controller 108 configured to control one or more operations of the high voltage generator 104 and a gesture detector 110 operationally coupled to the controller 108. The gesture detector 110 signals the controller 108 trigger the high voltage generator 104 upon detecting one or more gestures using the body part of the user. The body portion 102 further houses a power source 118 connected to one or more components for powering the operations of the components. In an instance, the power source 118 used in the apparatus 100 is a rechargeable battery.

In an embodiment, the body portion 102 housing the high voltage generator 104, the high voltage transmitter 106, the controller 108 and the gesture detector 110 is made from a non-conductive material such as plastic. In some other embodiment, the body portion 102 is made from a combination of non-conductive materials. In a yet another embodiment, the body portion 102 is specially configured to arrange the components such as the high voltage generator 104, the high voltage transmitter 106, the controller 108 and the gesture detector 110 enclosed within the body portion 102. In another instance, the body portion 102 is configured to position some of the components inside and some other components on an exterior of the body portion 102. The body portion 102 can further be made into different shapes for wearing around the body parts of the user. In one instance, the body portion 102 is made into a wearable band that can be worn around the wrist of the user. In some other instance, the body portion 102 is made in form of a wearable ring. In some other instance, the body portion 102 is made in form of a wearable gloves that can be comfortably worn by the user and utilize it when in need.

According to another embodiment, the wearable self-defense apparatus 100 also includes fitness tracking module 120 having one or more sensors 112 to detect a movement and other activities by the user. The data collected using the sensors 112 is sent to a processor 114 within the wearable self-defense apparatus 100 to measure and track the physical activities of the user. In some instances, the data collected using the sensors 112 is utilized for calculating the fitness parameters of the user. In such an instance, the present wearable self-defense apparatus 100 operates as a wearable fitness tracker device capable of tracking the fitness parameters of the user while performing one or more activities by the user. The users can also utilize the wearable self-defense apparatus 100 for self-defense when in need by performing the preset gestures using the body part such as the wrist of arm of the user on which the wearable self-defense apparatus 100 is attached. In some instance, the wearable self-defense apparatus 100 includes a display screen 122 to display a variety of information related to one or more activities of the user while performing fitness exercises.

Figure 2:
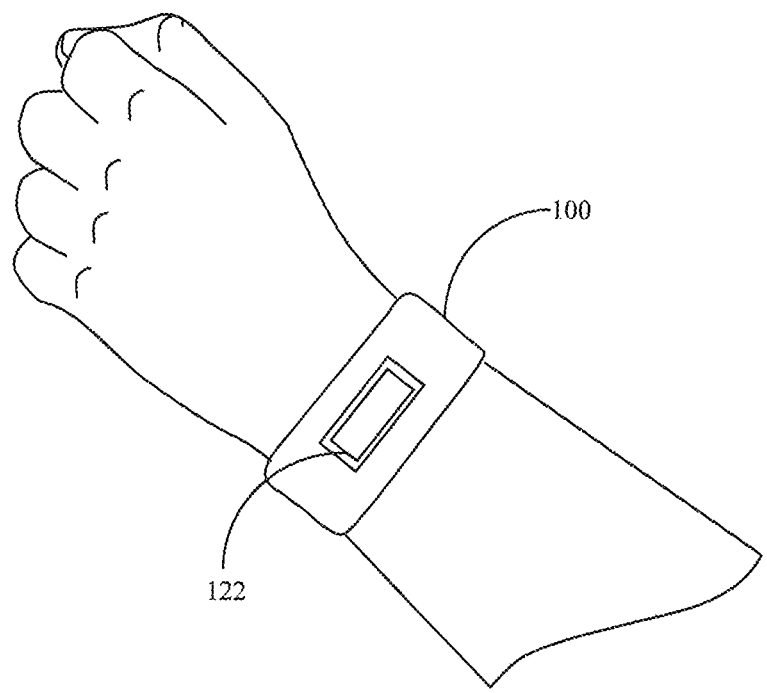
FIG. 2 is an exemplary diagram showing one or more gestures for operating the wearable self-defense apparatus.
Figure 3:
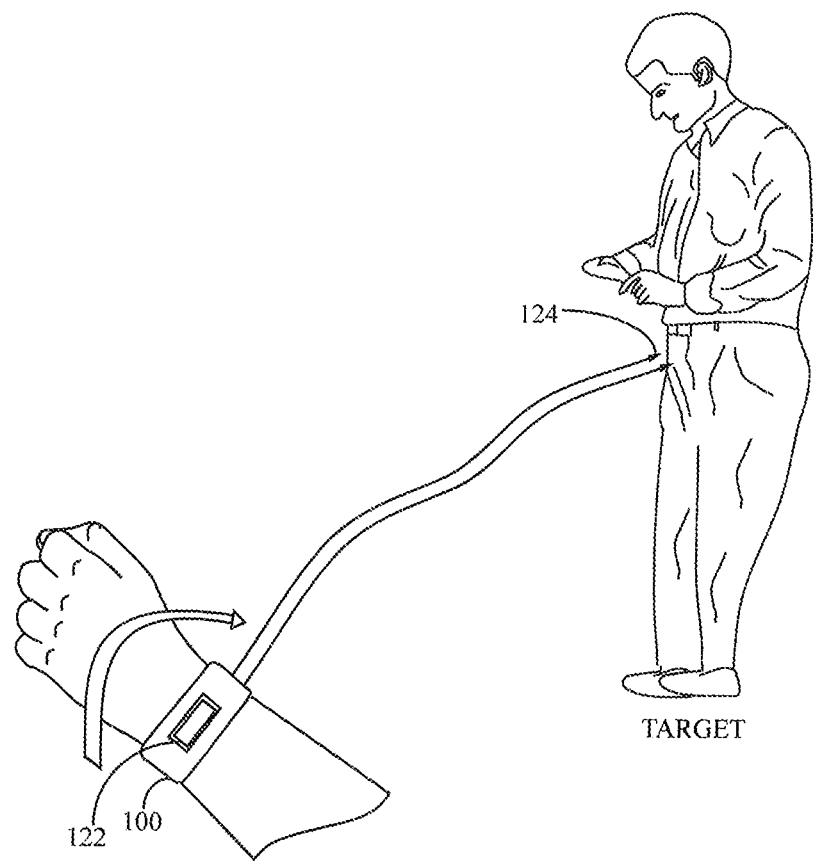
FIG. 3 is an exemplary diagram showing a method of using the wearable self-defense apparatus to disable an attacker.

FIG. 2 is an exemplary diagram showing one or more gestures for operating the wearable self-defense apparatus 100 as a self-defense device, according to an embodiment of the present invention. The wearable self-defense apparatus 100 in form of a wearable band worn on around the wrist or hand of the user includes one or more gesture detecting sensors 116, which forms a part of the gesture detector 110. Once the gesture detecting sensors 116 detects an action or a gesture using the wrist or arm of the user, it compares the recognized gesture movement with the preset gesture movement for activating or deactivating the high voltage generator or with the gesture for targeting the high voltage to the attacker. FIG. 3 is an exemplary diagram showing a method of using the wearable self-defense apparatus 100 to disable an attacker. In one embodiment, the gesture for activating the high voltage generator 104 is a rotation movement of the arm and wrist of the user. The gesture detecting sensors 116 associated with the gesture detector 110, according to one embodiment, detects a gesture in form of a rotation of the arm and wrist of the user in a first direction to signal the controller 108 to trigger the high voltage generator 104. The gesture detecting sensors 116 associated with the gesture detector 110, according to one embodiment, detects another gesture in form of a rotation of the arm and wrist of the user in a second direction to signal the controller 108 to stop an operation of the high voltage generator 104. The rotational movement of the arm and wrist of the user wearing the apparatus 100 can be in opposite directions to activate and deactivate the high voltage generator 104 using the controller 108. Once the high voltage generator 104 generates the high voltage electricity, the user can direct the apparatus 100 to the attacker and the high voltage transmitter 106 transmits the generated high voltage to the attacker or the target for temporarily disable the target. In certain embodiment, the high voltage transmitter 106 includes one or more electrical conductors 124 to transfer the high voltage generated by the high voltage generator 104 to the target.

Figure 4:
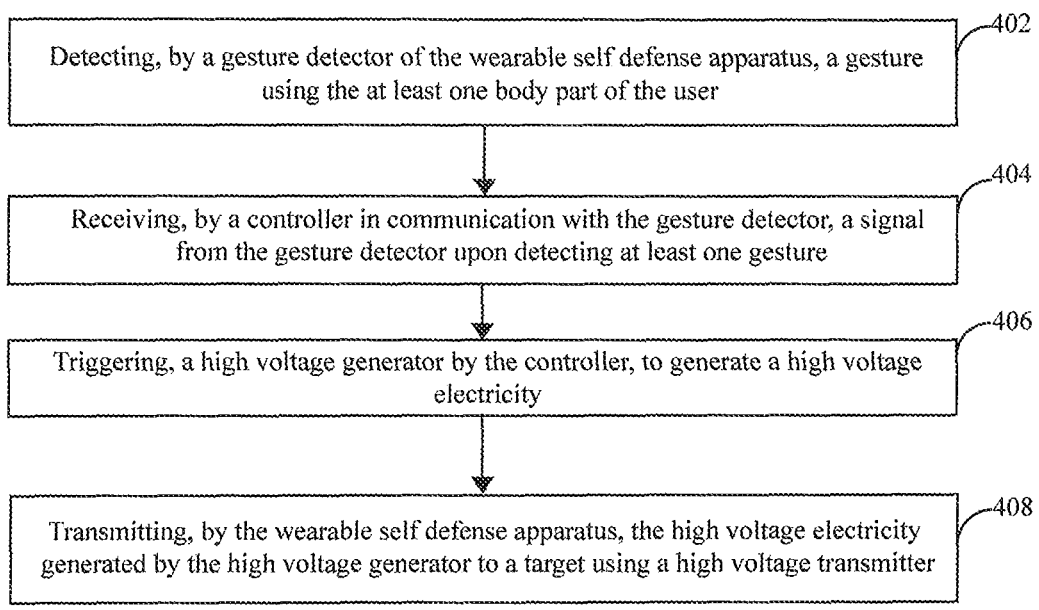
FIG. 4 is a flowchart of an exemplary method of utilizing the wearable self-defense apparatus worn on the body part of a user.

FIG. 4 is a flowchart of an exemplary method of utilizing the wearable self-defense apparatus 100 worn on the body part of a user to temporarily disable an attacker or a target. When the user encounters an attacker, the user can perform one or more of the following actions to temporarily disable an attacker. The method includes the steps of detecting, by the gesture detector 110, one or more gestures made using the body part of the user where the wearable self-defense apparatus 100 is attached, as in block 402. In one embodiment, the gesture for activating the high voltage generator 104 is a rotation movement of the arm and wrist of the user. The gesture detecting sensors 116 associated with the gesture detector 110, according to one embodiment, detects the gesture in form of a rotation of the arm and wrist of the user in a first direction to signal the controller 108 to trigger the high voltage generator 104. In some instance, the gesture detector 110 detects another gesture in form of a rotation of the arm and wrist of the user in a second direction to signal the controller 108 to stop an operation of the high voltage generator 104. In some other instances, only one gesture is used for operating the wearable self-defense apparatus 100. Once the gesture detector 110 identifies the gesture for activating the self-defense operation or mode of the wearable self-defense apparatus 100, a signal is automatically sent to the controller 108 for triggering the high voltage electricity using the high voltage generator 104, as in block 404. Upon receiving the trigger signal from the controller 108, the high voltage generator 104 generates the high voltage electricity as in block 406. Once the high voltage electricity is generated, the user can perform another gesture action to transmit the high voltage generated by the high voltage generator 104 to the target using the high voltage transmitter 106, as in block 408. In certain instances, the high voltage to the target is transmitted using one or more electrical conductors 124 electrically coupled to the high voltage transmitter 106. In some instance, the electrical conductors 124 are wired to the high voltage transmitter 106 or to an output of the high voltage generator 104. In some other instances, the high voltage transmitter 106 transmits the high voltage using electrodes that can be shot onto the body of the target to transfer the high voltage. In some instances, the target is identified by the electrical conductor 124 based on a direction of pointing of the wearable self-defense apparatus 100 by the user.

Further, it should be noted that the steps described in the method of use can be carried out in many different orders according to user preference. The use of "step of" should not be interpreted as "step for", in the claims herein and is not intended to invoke the provisions of 35 U.S.C. § 112, (6). Upon reading this specification, it should be appreciated that, under appropriate circumstances, considering such issues as design preference, user preferences, marketing preferences, cost, devices requirements, available services, technological advances, etc., other methods of use arrangements such as, for example, use of any other targeting method for delivering the high voltage electricity, elimination or addition of certain steps, including or excluding certain maintenance steps, etc., may be sufficient.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

The invention claimed is:

1. A wearable self-defense apparatus comprising:
 a body portion configured to be worn on at least one body part of a user;
 a high voltage generator configured to be secured to the body portion;
 a high voltage transmitter electrically coupled to the high voltage generator and comprising at least one electrical conductor to transfer high voltage electricity generated by the high voltage generator;
 a controller configured to control at least one operation of the high voltage generator; and
 a gesture detector operationally coupled to the controller, wherein the gesture detector, is configured to detect a plurality of gestures, and upon detecting one of the plurality of gestures using the at least one body part of the user, signaling the controller to control the at least one operation of the high voltage generator;

wherein the body portion is configured to be worn around a wrist of the user, and wherein the gesture detector is configured to detect said plurality of gestures including;

a rotation of the wrist of the user in a first direction to signal the controller to trigger the high voltage generator, and a rotation of the wrist of the user in a second direction to signal the controller to stop an operation of the high voltage generator;

wherein the high voltage transmitter is configured to direct said high voltage electricity in a direction that the conductors are pointed.

2. The apparatus of claim 1, wherein the body portion houses the high voltage generator, the high voltage transmitter, the controller and the gesture detector.

3. The apparatus of claim 1, wherein the body portion includes at least one adjustable portion to fit to the at least one body part of the user.

4. The apparatus of claim 1, wherein the body portion is made from at least one nonconductive material.

5. The apparatus of claim 1, wherein the body portion is in form of comprises a wearable band.

6. The apparatus of claim 1, wherein the high voltage transmitter includes at least one electrical conductor to transfer a high voltage electricity generated by the high voltage generator.

7. The apparatus of claim 1, wherein the body portion further houses a fitness tracking module having a plurality of sensors to detect at least one physical activity of the user.

8. The apparatus of claim 1, wherein the body portion further houses at least one power source coupled to the high voltage generator, the high voltage transmitter, the controller and the gesture detector.

9. A method of utilizing a wearable self-defense apparatus worn on at least one body part of a user, the method comprising:

providing the wearable self-defense apparatus of claim 1:

detecting, by said gesture detector of the wearable self-defense apparatus, a plurality of gestures using the at least one body part of the user;

wherein the body portion is configured to be worn around the wrist of the user, and wherein the gesture detector is configured to detect said plurality of gestures including;

a rotation of the wrist of the user in a first direction to signal the controller to trigger the high voltage generator, and a rotation of the wrist of the user in a second direction to signal the controller to stop an operation of the high voltage generator generating, by the wearable self-defense apparatus, a high voltage electricity, wherein a process of generating the high voltage electricity within the wearable self-defense apparatus comprises:

receiving, by said controller in communication with the gesture detector, a signal from the gesture detector upon detecting at least one gesture, triggering, said high voltage generator by the controller, to generate a high voltage electricity; and transmitting, by the wearable self-defense apparatus, the high voltage electricity generated by the high voltage generator to a target using a high voltage transmitter.

10. The method of claim 9, wherein the wearable self-defense apparatus houses the gesture detector, the controller, the high voltage generator and the high voltage transmitter in a body portion configured to be worn on the at least one body part of the user.

11. The method of claim 9, wherein transmitting the high voltage electricity to the target is transmitted using at least one electrical conductor electrically coupled to the high voltage transmitter.

12. The method of claim 11, further comprising by directing the high voltage electricity from the at least one electrical conductor toward a target by pointing of the wearable self-defense apparatus at said target.

* * * * *